(12) United States Patent
Koscher et al.

(10) Patent No.: US 7,500,844 B2
(45) Date of Patent: Mar. 10, 2009

(54) MOLD AND METHOD OF INJECTION MOLDING OBJECTS MADE OF POLYMERIC MATERIALS AND OBJECT OBTAINED THEREFROM

(75) Inventors: Matthieu Koscher, Charenton le Pont (FR); Noémie Lesartre, Charenton le Pont (FR)

(73) Assignee: Essilor International Compagnie Generale d'Optique, Charenton-le-Pont (FR)

( * ) Notice: Subject to any disclaimer, the term of this patent is extended or adjusted under 35 U.S.C. 154(b) by 0 days.

(21) Appl. No.: 11/422,500

(22) Filed: Jun. 6, 2006

(65) Prior Publication Data

US 2007/0132123 A1 Jun. 14, 2007

(30) Foreign Application Priority Data

Jun. 6, 2005 (FR) .................................. 05 05741

(51) Int. Cl.
*B29D 11/00* (2006.01)
*B29C 45/00* (2006.01)

(52) U.S. Cl. ........................ 425/190; 425/542; 425/573; 425/808; 264/1.32; 264/328.9; 264/328.12

(58) Field of Classification Search ................. 425/190, 425/192 R, 445, 446, 461, 464, 542, 567, 425/568, 571, 573, 808; 264/1.32, 328.9, 264/328.12, 1.1, 2.5
See application file for complete search history.

(56) References Cited

U.S. PATENT DOCUMENTS

| | | | | |
|---|---|---|---|---|
| 3,368,245 A | * | 2/1968 | Witkowski | 425/215 |
| 3,909,175 A | * | 9/1975 | Gemmill | 425/542 |
| 3,917,789 A | * | 11/1975 | Heisler | 264/219 |
| 4,604,256 A | * | 8/1986 | Greenwood et al. | 264/501 |
| 5,139,724 A | * | 8/1992 | Hofstetter et al. | 264/101 |
| 5,523,045 A | * | 6/1996 | Kudert et al. | 264/513 |
| 5,656,210 A | | 8/1997 | Hill et al. | 262/2.6 |
| 5,922,255 A | * | 7/1999 | McLeod | 264/40.1 |
| 6,203,638 B1 | * | 3/2001 | Uram | 156/89.11 |
| 6,855,286 B2 | * | 2/2005 | Osawa et al. | 264/328.12 |
| 6,884,381 B1 | * | 4/2005 | Hashimoto | 264/328.9 |
| 2003/0214058 A1 | * | 11/2003 | Belly et al. | 264/1.1 |

(Continued)

FOREIGN PATENT DOCUMENTS

EP 1504869 2/2005

(Continued)

*Primary Examiner*—Philip C Tucker
*Assistant Examiner*—Dimple N Bodawala
(74) *Attorney, Agent, or Firm*—Fulbright & Jaworski L.L.P.

(57) ABSTRACT

A mold for molding an optical element, in particular using a reaction injection molding method (RIM). The mold comprises a generally circular shaped, mold cavity having a geometrical center and a main plane, a sprue base with a longitudinal axis and a feed connection that makes the sprue base communicate with a feed sill of the mold cavity, the longitudinal axis of the sprue base and the geometrical center of the mold cavity defining a mold symmetry plane orthogonal to the main plane of the mold cavity, which intersection with said main plane defines a mold main axis, characterized in that the longitudinal axis of the sprue base together with a line perpendicular to the main plane of the mold cavity forms an angle ranging from 0 to 30°, preferably from 0 to 15°. Methods of using the mold and objects made thereby are also disclosed.

47 Claims, 3 Drawing Sheets

U.S. PATENT DOCUMENTS

2004/0099971 A1* 5/2004 Su et al. .................. 264/1.32
2005/0001140 A1* 1/2005 Su et al. .................... 249/120
2005/0153013 A1* 7/2005 Lee .......................... 425/552
2005/0200033 A1* 9/2005 Kadota et al. ............. 264/1.31

FOREIGN PATENT DOCUMENTS

| | | | | |
|---|---|---|---|---|
| JP | 01016622 A | * | 1/1989 |
| JP | 02227243 A | * | 9/1990 |
| JP | 06134819 A | * | 5/1994 |
| WO | WO 90/05061 | | 5/1990 |

* cited by examiner

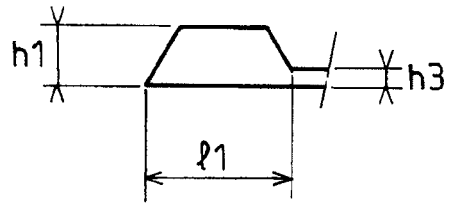
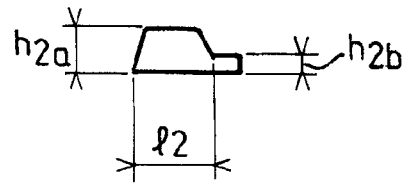
FIG. 3　　　　　FIG. 4
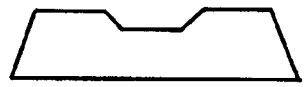
FIG. 5
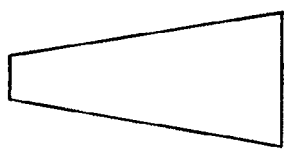
FIG. 6a
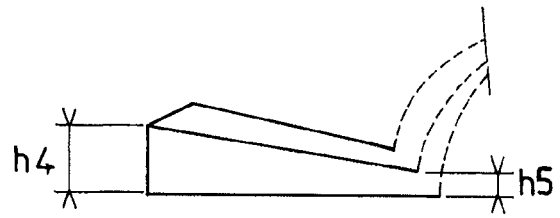
FIG. 7
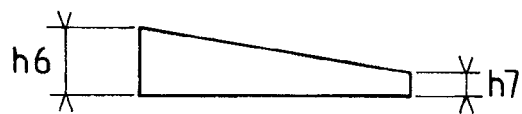
FIG. 6b

MOLD AND METHOD OF INJECTION MOLDING OBJECTS MADE OF POLYMERIC MATERIALS AND OBJECT OBTAINED THEREFROM

BACKGROUND OF THE INVENTION

1. Field of the Invention

The present invention relates generally to a mold for molding an optical element, in particular an ophthalmic lens, made of a thermosetting polymeric material, and more particularly using a reaction injection molding method (hereafter referred to as RIM).

2. Description of Related Art

Optical elements most often are made by molding and curing a liquid polymerizable composition in a suitable mold.

A method for using a polymerizable composition, hereafter referred to as reaction injection molding (or RIM), consists in introducing into the mold cavity or impression, a liquid polymerizable composition comprising at least two reagents that react with each other.

Reaction injection molding is a known method and a reaction injection molding method for contact lenses is especially described in the American patent U.S. Pat. No. 5,656,210.

For molding an optical element, it is necessary in order to obtain a transparent and structurally uniform end product that the mixing time combined with the filling time be shorter than the gelling time of the polymerizable composition. Reaction injection molding is a method wherein the mixing time is very fast. For this reason RIM makes it possible to use a polymeric material with very short gelling times.

However, in the context of optical element molding such as ophthalmic lenses, there still remain homogeneity and air-bubble entrapment problems within molded products especially due to this fast mixing time.

SUMMARY OF THE INVENTION

It is an object of the present invention to provide a mold, for a reaction injection molding method (RIM) of a liquid polymerizable composition to obtain a molded optical product that is transparent, homogeneous and free from entrapped air bubbles.

It is a further object of the present invention to provide a molding method for a liquid polymerizable composition using a mold such as defined hereabove, in particular for producing optical elements, and especially ophthalmic lenses.

The above mentioned objectives are aimed at according to the invention with a mold for molding, by a reaction injection molding method (RIM), an optical element made of a polymeric material from a liquid polymerizable composition, comprising a mold cavity that is generally circular, having a geometric center (G) and a main plane (XX, D1), a sprue base with a longitudinal axis, and a feed connection connected to a feed sill of the mold cavity and making the sprue base communicate with the feed sill of the mold cavity, the longitudinal axis of the sprue base and the geometrical center of the mold cavity defining a mold symmetry plane (XX, YY) orthogonal to the mold cavity main plane which intersection with said main plane defines a mold main axis, such mold being characterized by the fact that the longitudinal axis of the sprue base, together with a line perpendicular to the main plane of the mold cavity, forms an angle ranging from 0° to 30°, preferably from 0° to 15°.

According to a preferred embodiment of the mold of the invention, the longitudinal axis of the sprue base is perpendicular to the main plane of the mold cavity.

The mold cavity may have a plane, concave or convex profile. Should the mold cavity have a concave or a convex profile, the main plane of the mold cavity is defined as being the plane running through all points of the mold cavity circumference.

According to a further preferred embodiment of the mold of the invention, the feed connection comprises a delta-shaped central feed channel that expands in and towards the mold cavity main plane and two side feed channels that are arranged symmetrically to the mold symmetry plane, on either side of the central channel, each comprising a curved part that tangentially extends along the mold cavity feed sill up to an outer end so that a straight line (D2, D2') running through an outer end of a tangential curved part and the geometrical center (G) of the mold cavity, together with a straight line (D1) running through the geometrical center (G) of the mold cavity and being perpendicular to the mold symmetry plane, forms an angle ($\alpha$, $\alpha'$) ranging from 0° to 60°, preferably from 10° to 30° and more preferably from 12° to 18°.

As defined here by the present invention the values for the different angles are such as defined according to the trigonometric standard system. So the values for the $\alpha$-, $\beta$-, and $\gamma$-angles are positive angle values, and the values for the $\alpha'$-, $\beta'$-, and $\gamma'$-angles are negative angle values.

The mold according to the invention is further defined by following characteristics as being considered separately or as any technically feasible combination of the same:

- The feed connection is connected to the mold cavity feed sill by means of a fillet;
- Each of the tangential curved parts comprises an inner end delimited by the straight line (D3, D3') and has a trapezoidal cross-section with a decreasing homothetic transformation as related to a generatrix, in its width and its height, between its inner end and its outer end;
- The trapezoidal cross-section height for each of the tangential curved parts comprises at its outer end from 30% to 70%, preferably from 45% to 55%, of the trapezoidal cross-section height at its inner end;
- The trapezoidal cross-section width for each of the tangential curved parts from its lower base to its outer end comprises from 30% to 70%, preferably from 45% to 55%, of its width at its inner end;
- A straight line (D3, D3') running through the inner end of a tangential curved part and the geometrical center (G) of the mold cavity forms with the mold main axis (XX) an angle ($\beta$, $\beta'$) ranging from 5° to 45°, preferably from 5° to 15°;
- Each of the tangential curved parts is connected along its all length with the mold cavity feed sill through a side part of the fillet;
- The ratio between the cross-section height of the fillet side part at the inner end of the tangential curved part and the trapezoidal cross-section height of the tangential curved part at this inner end varies from 0.1 to 0.7, preferably from 0.2 to 0.3;
- The ratio between the cross-section height of the fillet side part at the outer end of the tangential curved part and the trapezoidal cross-section height of the tangential curved part at this outer end varies from 0.1 to 0.7, preferably from 0.2 to 0.3;
- Each side channel comprises a straight part extending from the inner end of the tangential curved part up to the sprue base;

The axis (D4, D4') for each of the straight parts of each side channel forms with the mold main axis (XX) an angle (γ,γ') ranging from 1° to 30°, preferably from 1° to 10°;

The cross-section of each straight part of the side channels is geometrically trapezoidal;

The sprue base is connected to the feed connection by means of a casting sill, preferably of trapezoidal form;

The ratio between the cross-section height of the straight parts at the inner ends of the tangential curved parts and the cross-section height of the straight parts of the side channels at the casting sill level varies from 0.5 to 0.8, and is preferably 0.65±0.02.

The central feed channel is connected to the feed sill through a central part of the fillet;

The central feed channel has a decreasing homothetic transformation as related to its height from the casting sill to the feed sill;

The ratio between the cross-section height of the central feed channel at the supply level and the cross-section height of the central feed channel at the casting sill level varies from 0.5 to 0.8, and preferably is 0.62±0.02.

The cross-sectional area of the feed connection on whatever point of the mold main axis and up to its inner end at most varies by 5%, and preferably is constant;

The mold comprises at least a first outlet chamber that communicates with the mold cavity;

The first outlet chamber is located completely opposite the feed connection;

The mold optionally comprises two additional outlet chambers that communicate with the mold cavity and that are arranged on either side of the first chamber according to a mold cavity radius forming with the main axis an angle ranging from 30° to 90°;

When the outlet chambers have a volume representing from 10 to 40% of the mold cavity volume, it is preferably 25%;

When the outlet chambers have any geometric shape, they may in particular be trapezoidal;

The mold cavity is circular and has a diameter ranging from 40 to 90 mm, preferably from 50 mm to 85 mm.

The mold makes it possible to mold optical elements the thickness of which ranges from 1 mm to 20 mm, and having optionally a bend radius ranging from 50 mm to 300 mm.

The present invention also relates to a molding method, especially using reaction injection (RIM), of a molded body such as an optical element, in particular an ophthalmic lens, by means of the mold as described hereabove and which comprises the following steps:

mixing the polymers so as to form a liquid polymerizable composition;

injecting the liquid polymerizable composition;

filling the mold and compacting the composition;

polymerizing, in particular through thermal initiated polymerization;

opening the mold; and discharging the molded body.

Should the mold comprise an outlet chamber, the process may in addition comprise a compacting step of the air that has been evacuated and contained in the outlet chamber (by injecting a greater volume of composition as compared to the volume of the mold cavity), this compacting step being carried out concomitantly to the mold cavity filling step.

For molding an optical element by means of the mold according to the invention, any polymerizable composition can be used comprising at least one polymer of the polyurethane, polythiourethane, polyurethane-urea, epoxy, and episulfide families.

The mold according to the invention has thus a geometry that enables in particular:

to obtain a laminar type flow of the polymerizable composition;

to limit any turbulence zone within the polymerizable composition that is already present in the mold cavity;

to avoid air entrapment.

These different benefits of the mold are in particular obtained thanks to the liquid polymerizable composition injection from the sprue base into the mold cavity in a plane orthogonal to that of the mold cavity.

In addition to this orthogonal injection as compared to the feed sill, the mold is substantially characterized by a feed system comprising a feed connection double tangential with a delta-shaped central channel.

Such feed system geometry, as well as the profile of the fillet connecting the double tangential curved parts to the feed sill, the arrangement of the double tangential curved parts as compared to the mold cavity as well as the geometry, the size and the configuration of the feed connection represent important parameters for obtaining an acceptable end product.

Using such a mold, in particular for molding an ophthalmic lens, enables a uniform filling of the mold cavity without any turbulence. The applicant did observe that there were no air bubbles within the mold cavity, and simultaneously that the polymerizable composition was homogenous.

Alternatively, should the mold comprise one or more outlet chamber(s) distributed around the circumference of the mold cavity, this or these outlet chamber(s) does or do play a double role:

on the one hand it or they make(s) it possible to purge the air contained in the mold cavity during the filling step;

on the other hand it or they make(s) it possible to compact the air and so the injected material, at the end of the filling step by injecting an additional amount of the polymerizable composition, since part of the injected polymerizable composition may come into the one or more outlet chamber(s).

BRIEF DESCRIPTION OF THE DRAWINGS

The following description refers to the enclosed figures which respectively represent:

in FIGS. 3, 4 and 5, illustrations of the cross-sections for different parts of the feed connection taken along the A-A, B-B and C-C lines respectively;

in FIGS. 6a and 6b, schematic illustrations of a top view and of the longitudinal cross-section, respectively, for the central channel of the feed connection; and in FIG. 7, a schematic perspective view of a side feed channel for its straight part of the feed connection.

DETAILED DESCRIPTION OF ILLUSTRATIVE EMBODIMENTS

Figure 1:
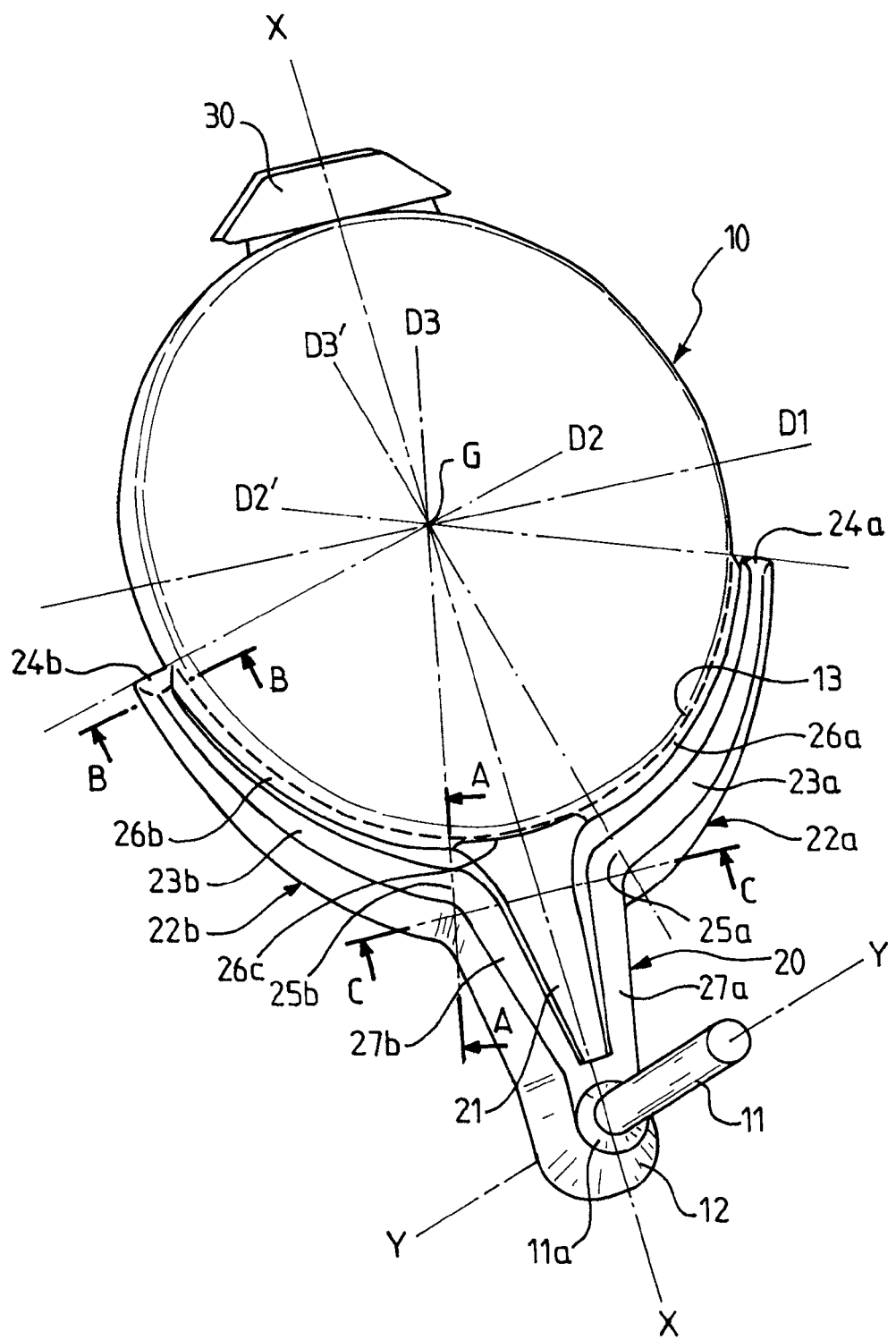
in FIG. 1, a schematic perspective view of a mold according to the invention.
Figure 2:
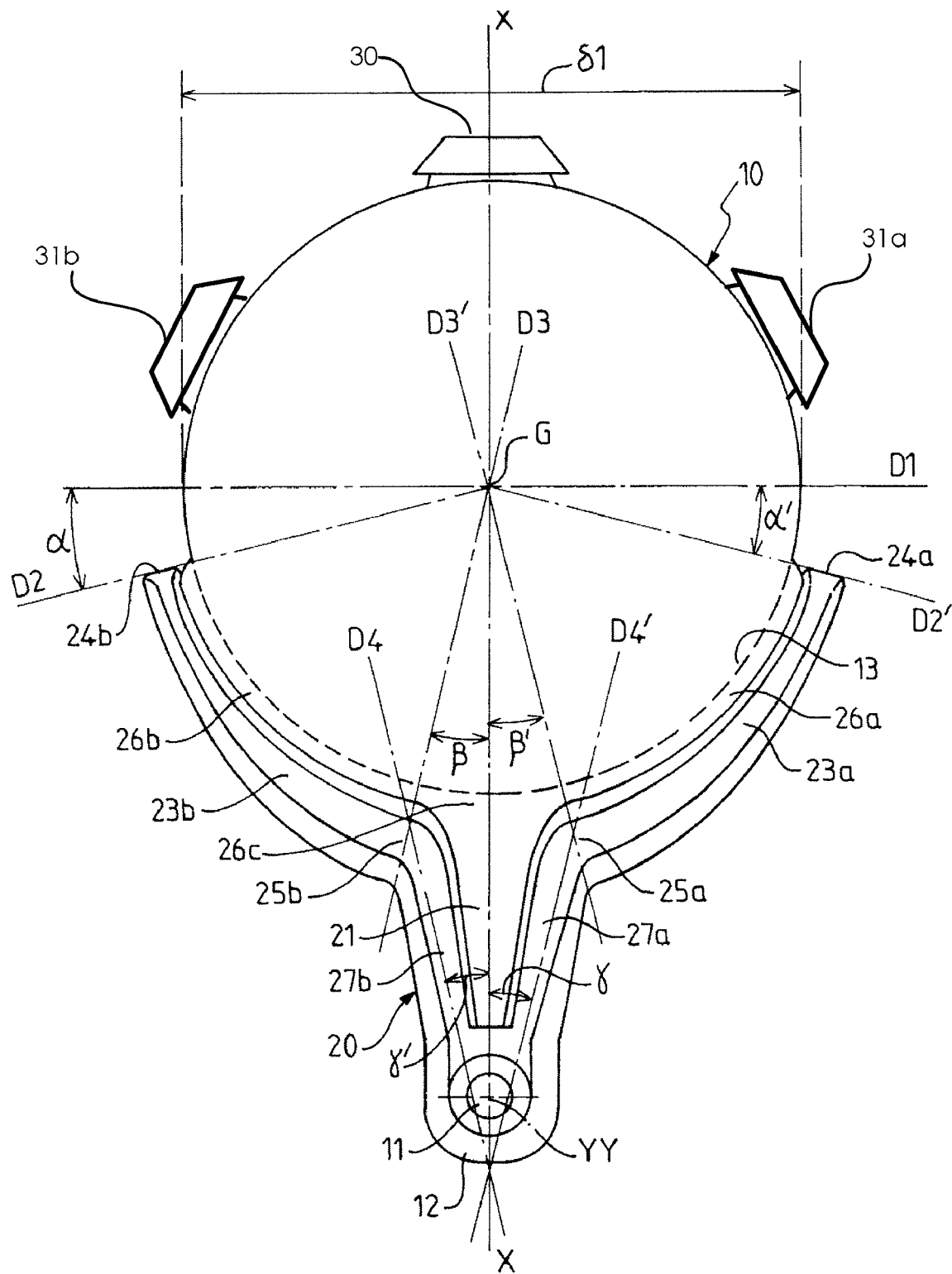
in FIG. 2, a top view of the mold of FIG. 1.

Referring to FIGS. 1 and 2, an embodiment of a mold according to the invention is described.

The mold comprises a mold cavity 10 that is generally circular shaped having a geometrical center G and the circumference of which defines the main plane of the mold cavity as well as that of the mold as a whole (see the plane on sheet for FIG. 2).

The mold is connected to a sprue base 11 for injecting a liquid polymerizable composition into the mold cavity 10.

The generally cylindrical sprue base is connected to the mold at one end by means of a tapered part 11a to a casting sill 12 which function as will be seen hereafter is to deviate the flowing direction of the injected polymerizable composition. The casting sill 12 is made to communicate with the mold cavity 10 through the feed connection 20.

The axis YY of the sprue base 11 defines together with the geometrical center G of the mold cavity 10 a plane orthogonal to the main plane of the mold cavity. In general, this axis YY of the sprue base 11 forms together with a line perpendicular to the main plane (XX,D1) of the mold cavity 10 an angle ranging from 0° to 30°, preferably from 0° to 15° and is preferably perpendicular to the plane of the mold cavity 10.

The feed connection 20 orientated according to the mold cavity main plane 10 is connected both to the casting sill 12 and to the mold cavity 10 and makes the sprue base 11 communicate with the feed sill 13 of the mold cavity 10.

The feed connection 20 comprises a delta-shaped, central feed channel 21 expending in and towards the mold cavity main plane 10 and a side channel 22a, 22b arranged symmetrically to the mold symmetric axis (XX), on either side of the central channel 21, comprising a straight part 27a, 27b beginning at the casting sill level 12 and extending towards the mold cavity 10 and a curved part 23a, 23b. Each of the straight parts 27a, 27b is connected to an inner end 25a, 25b respectively delimited by straight lines D3 and D3' running through the center G. Each inner end 25a, 25b extends within the curved part 23a, 23b of the side channel 22a, 22b up to an outer end 24a, 24b respectively delimited by the straight lines D2 and D2'. The extension of the inner end 25a, 25b at the outer end 24a, 24b is tangential to the feed sill 13 of the mold cavity 10 as indicated by the (short) broken lines on the circumference of the mold cavity.

The outer ends 24a, 24b for each of the tangential curved parts 23a, 23b are so located that a straight line (D2, D2') tangential to the outer end 24a, 24b for each of the tangential curved parts 23a, 23b and running through the geometrical center G of the mold cavity 10 forms together with a straight line D1 running through the geometrical center G of the mold cavity 10 and perpendicular to the mold symmetry plane (a main axis XX) an angle ($\alpha$, $\alpha'$) that may vary from 0° to 60°, preferably from 10° to 30° and more preferably from 12° to 18°. In FIG. 2, the angle $\alpha$ is 15°, and $\alpha'$ is −15°

As can be seen in FIGS. 3 and 4, each of the tangential curved parts 23a, 23b has a trapezoidal cross-section geometry with a decreasing homothetic transformation as related to a generatrix, in its width and its height, between its inner end 25a, 25b and its outer end 24a, 24b.

Height h2 of the trapezoidal cross-section for each of the tangential curved parts 23a, 23b at its outer end 24a, 24b comprises from 30% to 70%, preferably from 45% to 55%, of its height h1 at its inner end 25a, 25b.

The trapezoidal cross-section for each of the tangential curved parts 23a, 23b has a lower base which width l2 at its outer end 24a, 24b comprises from 30% to 70%, preferably from 45% to 55%, of width l1 of its lower base at its inner end 25a, 25b.

The tangential curved parts 23a, 23b are connected along their all length to the mold cavity 10 by part 26a, 26b of a fillet that makes them communicate with the feed sill 13 of the mold cavity 10.

The ratio between height h3 of parts 26a, 26b of the fillet at the inner ends 25a, 25b of the tangential curved parts 23a, 23b and height h1 of the cross-section of the tangential curved parts 23a, 23b at these inner ends 25a, 25b varies from 0.1 to 0.7, preferably from 0.2 to 0.3.

The ratio between height h2b of the parts 26a, 26b of the fillet at the outer ends 24a, 24b of the tangential curved parts 23a, 23b and height h2a of the cross-section of the tangential curved parts 23a, 23b at these outer ends 25a, 25b varies from 0.1 to 0.7 preferably from 0.2 to 0.3.

As can be seen in FIGS. 5 and 7, the cross-section for each of the straight parts 27a, 27b is geometrically trapezoidal and has a decreasing homothetic transformation as related to its height from the casting sill 12 up to the inner end 25a, 25b of the tangential curved part 23a, 23b. The ratio between the cross-section height h5 of a straight part 27a, 27b at the inner end 25a, 25b of the tangential curved part 23a, 23b and height h4 at the casting sill level 12 varies from 0.5 to 0.8 and preferably is 0.65±0.02. Also preferably the cross-section of the straight parts 27a, 27b has an increasing homothetic transformation as related to its width from the casting sill 12 up to the inner end 25a, 25b of the tangential curved part 23a, 23b.

Moreover, the central longitudinal axis running respectively through the straight lines (D4, D4') of the straight parts 27a, 27b forms together with the mold main axis XX an angle ($\gamma$, $\gamma'$) that generally varies from 1° to 30°, preferably from 1° to 10°.

The delta-shaped, central channel 21 expanding towards the mold cavity 10 extends from the casting sill 12 up to the feed sill 13 of the mold cavity 10 and is connected to the feed sill 13 of the mold cavity by means of a central part 26c of the fillet 26.

As can be seen from FIG. 6b, this central part 21 has a cross-section which height decreases from the casting sill 12 up to the central part 26c of the fillet 26.

The ratio between the cross-section height h7 of the central part 21 at the fillet 26c and the cross-section height h6 at the casting sill 12 varies from 0.5 to 0.8, and preferably is 0.62±0.02. Obviously, height h6 of the central channel 21 at the casting sill is similar to height h4 of the straight parts 27a, 27b.

In general, the cross-section area of the feed connection 20 in any point of the mold main axis XX up to the fillet 26 to feed sill 13 of the mold cavity is substantially constant, in other words does not vary by more than 5%.

In the context of the present invention, the different angles of the mold will be preferably rounded so as to make the polymerizable material flow easier within the mold. In particular it applies to the angles at the outer ends 24a, 24b, and at the inner ends 25a, 25b for each of the tangential curved parts 23a, 23b.

The mold cavity 10 is provided in its periphery with at least one air purging means initially present in the mold cavity 10. This purging means may classically be an air vent arranged at the top of the mold cavity 10 completely opposite the sprue base 11.

Preferably in the present invention, the air purging means comprises at least one outlet chamber 30 that communicates with the mold cavity 10 and that is located at the top of the mold cavity 10 completely opposite the sprue base 11.

The mold according to the invention may comprise additional outlet chambers similar to the outlet chamber 30 located at the periphery and especially two other chambers 31a, 31b on either side of the first chamber 30 arranged according to radii of the mold cavity 10 forming with the mold main axis XX an angle ranging from 30° to 90°, preferably an angle of 60°.

The outlet chamber 30 preferably has a volume comprising generally from 10 to 40% of the mold cavity volume, and preferably 25% of said volume.

When molding an optical element with the mold according to the present invention, the liquid polymerizable composition is introduced perpendicularly to the main plane of the mold cavity 10 by means of the sprue base 11. The liquid polymerizable composition flow is then carried up to the feed sill 13 of the mold cavity through the feed connection 20. The liquid polymerizable composition is introduced into the mold cavity 10 through the feed connection with a laminar type flow, thus preventing any turbulence zone and any air entrapment to be formed within the polymerizable material present in the mold cavity.

Moreover, the air initially present in the mold cavity 10 is evacuated towards the outlet chamber 30.

Moreover, using at least one outlet chamber makes it possible for the liquid polymerizable composition injected into the mold cavity to be forced because of the possible air compacting, at the end of filling, by injecting an exceeding amount of the liquid polymerizable composition.

In general, the liquid polymerizable composition flow rate of the central channel 21 at the feed sill 13 of the mold cavity 10 varies from 10 grams per second to 30 grams per second.

Once filled up, the mold may be heated to a temperature suitable for conducting the polymerization or for terminating the polymerization of the polymerizable composition filling the mold cavity 10.

After polymerization, the mold is opened and the optical blank is removed.

As defined in the present invention optical elements refer particularly to ophthalmic lenses and to lenses for optical instruments. As used herein, ophthalmic lenses refer to lenses especially adapting to a spectacle frame, which objective consists in protecting the eye and/or correcting the vision of a wearer.

The invention claimed is:

1. A mold for molding an optical element from a liquid polymerizable composition comprising:
    a mold cavity having a generally circular shape with a geometrical center and a main plane;
    a sprue base with a longitudinal axis; and
    a feed connection that makes the sprue base communicate with a feed sill of the mold cavity;
    wherein:
    the longitudinal axis of the sprue base and the geometrical center of the mold cavity define a mold symmetry plane, wherein the mold symmetry plane is orthogonal to the main plane of the mold cavity, and the intersection of the mold symmetry plane and the main plane defines a mold main axis;
    the longitudinal axis of the sprue base forms an angle from 0 to 30° with a line perpendicular to the main plane of the mold cavity; and
    the feed connection comprises:
        a delta-shaped, central feed channel expanding, in the mold cavity main plane, towards the mold cavity; and
        two side feed channels arranged symmetrically to the mold symmetry plane on either side of the central channel, each side feed channel comprising a curved part that tangentially extends along the feed sill of the mold cavity up to an outer end so that a straight line running through the outer end of a tangential curved part and the geometrical center of the mold cavity forms an angle ranging from 0° to 60° with a straight line running through the geometrical center of the mold cavity and perpendicular to the mold symmetry plane.

2. The mold of claim 1, wherein the angle formed by the longitudinal axis of the sprue base and the line perpendicular to the main plane of the mold cavity is 0° to 15°.

3. The mold of claim 1, wherein the angle formed by the line running through the outer end of a tangential curved part and the geometrical center of the mold cavity with the straight line running through the geometrical center of the mold cavity and perpendicular to the mold symmetry plane is 10° to 30°.

4. The mold of claim 1, wherein the angle formed by the line running through the outer end of a tangential curved part and the geometrical center of the mold cavity with the straight line running through the geometrical center of the mold cavity and perpendicular to the mold symmetry plane is 12° to 18°.

5. The mold of claim 1, wherein the longitudinal axis of the sprue base is perpendicular to the main plane of the mold cavity.

6. The mold of claim 1, wherein each of the tangential parts additionally comprises an inner end and has a trapezoidal cross-section with a decreasing homothetic transformation as related to a generatrix, in its width and its height, between its inner end and its outer end.

7. The mold of claim 6, wherein the height of the trapezoidal cross-section for each of the tangential curved parts has a height at its outer end which is from 30% to 70% of the height at its inner end.

8. The mold of claim 7, wherein the height of the trapezoidal cross-section for each of the tangential curved parts at its outer end is from 45% to 55% of the height at its inner end.

9. The mold of claim 6, wherein the cross-section of each of the tangential parts has a lower base width at its outer end comprising from 30% to 70% of the lower base width at its inner end.

10. The mold of claim 9, wherein the cross-section of each of the tangential parts has a lower base width at its outer end comprising from 45% to 55% of the lower base width at its inner end.

11. The mold of claim 6, wherein a straight line running through the inner end of a tangential curved part and the geometrical center of the mold cavity together with the mold main axis forms an angle ranging from 5° to 45°.

12. The mold of claim 11, wherein the angle ranges from 5° to 15°.

13. The mold of the claim 1, wherein the feed connection is connected to the feed sill by a fillet.

14. The mold of claim 13, wherein each of the tangential curved parts is connected all along its length to the feed sill of the mold cavity through of a side part of the fillet.

15. The mold of claim 14, wherein:
    the side part of the fillet at the inner end of the tangential curved part has a height, wherein the tangential curved part at this inner end has a height; and
    the ratio between height of the side part of the fillet at the inner end of the tangential curved part and height of the tangential curved part at this inner end varies from 0.1 to 0.7.

16. The mold of claim 15, wherein the ratio between height of the side part of the fillet at the inner end of the tangential curved part and height of the tangential curved part at this inner end varies from 0.2 to 0.3.

17. The mold of claim 14, wherein:
    the side part of the fillet at the outer end of the tangential curved part has a height, wherein the cross-section of the tangential curved parts at these outer ends has a height; and the height of the side parts of the fillet at the outer ends of the tangential curved parts together with height of the cross-section of the tangential curved parts at these outer ends varies from 0.1 to 0.7.

18. The mold of claim 17, wherein the height of the side parts of the fillet at the outer ends of the tangential curved parts together with height of the cross-section of the tangential curved parts at these outer ends varies from 0.2 to 0.3.

19. The mold of claim 6, wherein each side channel comprises a straight part extending from the inner end of the tangential curved part to the sprue base.

20. The mold of claim 19, wherein each straight parts has an axis and the axis of each of the straight parts together with the mold main axis forms an angle ranging from 1° to 30°.

21. The mold of claim 20, wherein the angle ranges from 1° to 10°.

22. The mold of claim 19, wherein each straight part of the side channels has a cross-section that is trapezoidal.

23. The mold of claim 22, wherein:
each straight part begins at the casting still level;
the cross-section of the straight parts of the side channels at the inner ends of the tangential curved parts has a height;
the cross-section of the straight parts at the casting sill level has a height; and
the ratio between the cross-section height of the straight parts of the side channels at the inner ends of the tangential curved parts and the cross-section height of the straight parts at the casting sill level varies from 0.5 to 0.8.

24. The mold of claim 23, wherein the ratio between the cross-section height of the straight parts of the side channels at the inner ends of the tangential curved parts and the cross-section height of the straight parts at the casting sill level is 0.65±0.02.

25. The mold of claim 13, wherein the central feed channel is connected through a central part of the fillet to the feed sill of the mold cavity.

26. The mold of claim 25, wherein:
each straight part begins at the casting still level;
the central part at the fillet has a cross section height;
the cross-section of the straight parts at the casting sill level has a height; and
the ratio between the cross-section height of the central part at the fillet and the cross-section height at the casting sill level varies from 0.5 to 0.8.

27. The mold of claim 26, wherein the ratio between the cross-section height of the central part at the fillet and the cross-section height at the casting sill level is 0.62±0.02.

28. The mold of claim 13, wherein the feed connection has a straight cross-sectional area that does not vary by more than 5% in any point of the mold main axis and up to the fillet to the feed sill.

29. The mold of claim 28, wherein the cross-section area of the feed connection in any point of the mold main axis and up to the fillet to the feed sill is constant.

30. The mold of claim 1, further comprising at least one first outlet chamber in operable communication with the mold cavity.

31. The mold of claim 30, wherein the first outlet chamber is located opposite the feed connection.

32. The mold of claim 30, further comprising two additional outlet chambers in operable communication with the mold cavity and located on either side of the first chamber with a mold cavity radius formed with the main axis an angle ranging from 30° to 90°.

33. The mold of claim 31, wherein the outlet chamber has a volume, the mold cavity has a volume, and the outlet chamber volume is from 10% to 40% of the mold cavity volume.

34. The mold of claim 33, wherein the outlet chamber has a volume of 25% of the mold cavity volume.

35. The mold of claim 1, wherein the mold cavity is circular and has a diameter of from 40 to 90 mm.

36. The mold of claim 35, wherein the mold cavity has a diameter of from 30 mm to 85 mm.

37. The mold of claim 1, wherein the mold cavity has a thickness of from 1 mm to 20 mm to mold optical elements from 1 mm to 20 mm thick during use.

38. The mold of claim 1, wherein the mold cavity has a bend radius ranging from 50 mm to 300 mm to mold optical elements having a bend radius ranging from 50 mm to 300 mm during use.

39. A method of reaction injection molding method (RIM) comprising:
mixing polymers to form a liquid polymerizable composition,
injecting the polymerizable composition into a mold of claim 1;
filling the mold and compacting the composition;
polymerizing the composition;
opening the mold; and
obtaining a molded body.

40. The method of claim 39, wherein polymerizing the composition comprises thermal-initiated polymerization.

41. The method of claim 39, wherein the mold comprises at least one outlet chamber, and the method comprises in addition a compacting step for the air present in the outlet chamber that is carried out concomitantly to the mold filling step.

42. The method of claim 41, wherein the molded body is an optical element.

43. The method of claim 42, wherein the optical element is an ophthalmic lens.

44. The method of claim 39, wherein the liquid polymerizable composition comprises at least one polymer from the polyurethane, polythiourethane, polyurethane-urea, epoxy, and/or episulfide family.

45. The method of claim 39, wherein the liquid polymerizable composition is delivered to the central channel at the feed sill at a flow rate of from 10 to 30 g/s.

46. The mold of claim 6, wherein:
the side part of the fillet at the inner end of the tangential curved part has a height, wherein the tangential curved part at this inner end has a height; and
the ratio between height of the side part of the fillet at the inner end of the tangential curved part and height of the tangential curved part at this inner end varies from 0.1 to 0.7.

47. The mold of claim 6, wherein:
the side part of the fillet at the outer end of the tangential curved part has a height, wherein the cross-section of the tangential curved parts at these outer ends has a height; and
the height of the side parts of the fillet at the outer ends of the tangential curved parts together with height of the cross-section of the tangential curved parts at these outer ends varies from 0.1 to 0.7.

* * * * *